United States Patent
Bontu et al.

(10) Patent No.: US 10,492,172 B2
(45) Date of Patent: Nov. 26, 2019

(54) SYSTEM INFORMATION BLOCK ENHANCEMENTS

(71) Applicant: TELEFONAKTIEBOLAGET LM ERICSSON (PUBL), Stockholm (SE)

(72) Inventors: Chandra Bontu, Nepean (CA); Prabaharan Kanesalingam, Ottawa (CA); Patrick Lie Chin Cheong, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/750,466

(22) PCT Filed: Aug. 5, 2016

(86) PCT No.: PCT/IB2016/054758
§ 371 (c)(1),
(2) Date: Feb. 5, 2018

(87) PCT Pub. No.: WO2017/021939
PCT Pub. Date: Feb. 9, 2017

(65) Prior Publication Data
US 2018/0220394 A1    Aug. 2, 2018

Related U.S. Application Data

(60) Provisional application No. 62/209,447, filed on Aug. 25, 2015, provisional application No. 62/201,250, filed on Aug. 5, 2015.

(51) Int. Cl.
*H04W 72/00* (2009.01)
*H04W 48/10* (2009.01)
(Continued)

(52) U.S. Cl.
CPC ............ *H04W 72/005* (2013.01); *H04L 1/08* (2013.01); *H04L 5/0044* (2013.01);
(Continued)

(58) Field of Classification Search
CPC .. H04L 5/0094; H04L 5/0044; H04W 72/005; Y02D 70/21
See application file for complete search history.

(56) References Cited

U.S. PATENT DOCUMENTS

| | | | |
|---|---|---|---|
| 2015/0195094 A1* | 7/2015 | Yu | H04W 4/70 370/312 |
| 2015/0237545 A1* | 8/2015 | Takano | H04W 48/10 370/331 |
| 2017/0230951 A1* | 8/2017 | Xiong | H04W 4/70 |

OTHER PUBLICATIONS

Catt, :Necessity of (E)OFCCG Scheduling PDSCH for SIB/paging/RAR, 3GPP Draft, R1-140076, 3rd Generation partnership project (3GPP), Mobile Competence Centre: Feb. 10, 2014.
(Continued)

*Primary Examiner* — Rebecca E Song
(74) *Attorney, Agent, or Firm* — Murphy, Bilak & Homiller, PLLC

(57) ABSTRACT

A network node may identify a location to be allocated for a multicast message within a transmission subframe based on at least information identifying the transmission subframe, and then transmit the multicast message at the identified location in the transmission subframe. A network node may also identify a transmission subframe in which to transmit a multicast message, allocate transmission resources in the transmission subframe for the multicast message, and transmit information indicating a location of the allocated transmission resources in the transmission subframe in a control signal message having a transmission power adjusted based on at least one of information identi-
(Continued)

fying the transmission subframe and a code redundancy version of the multicast message.

21 Claims, 12 Drawing Sheets

(51) Int. Cl.
*H04W 52/02* (2009.01)
*H04L 1/08* (2006.01)
*H04L 5/00* (2006.01)
*H04W 72/04* (2009.01)

(52) U.S. Cl.
CPC ........... *H04L 5/0094* (2013.01); *H04W 48/10* (2013.01); *H04W 52/0216* (2013.01); *H04W 52/0219* (2013.01); *H04W 52/0229* (2013.01); *H04W 72/0446* (2013.01); *Y02D 70/00* (2018.01); *Y02D 70/1224* (2018.01); *Y02D 70/1262* (2018.01); *Y02D 70/142* (2018.01); *Y02D 70/146* (2018.01); *Y02D 70/21* (2018.01)

(56) References Cited

OTHER PUBLICATIONS

3rd Generation Partnership Project; Technical Specification Group Radio Access Network; Evolved Universal Terrestrial Radio Access (E-UTRA); Medium Access Control (MAC) protocol specification(Release 12), Dec. 2014.

\* cited by examiner

SYSTEM INFORMATION BLOCK ENHANCEMENTS

CROSS-REFERENCE TO RELATED APPLICATIONS

This application is a national stage application of international application No. PCT/IB2016/054758, filed Aug. 5, 2016, which claims the benefit of U.S. Patent Application No. 62/201,250 filed on Aug. 5, 2015 and U.S. Patent Application No. 62/209,447 filed on Aug. 25, 2015, the respective disclosures of which are hereby incorporated by reference in their entirety.

TECHNICAL FIELD

The disclosed subject matter relates generally to communication systems, and more particularly to system information block (SIB) enhancements for communication systems.

BACKGROUND

There are currently many radio/wireless and cellular access technologies and standards such as Global System for Mobile Communications/General Packet Radio Service (GSM/GPRS), Wideband Code Division Multiple Access/High Speed Packet Access (WCDMA/HSPA), CDMA-based technologies, wireless fidelity (WiFi), Worldwide Interoperability for Microwave Access (WiMAX) and Long Term Evolution (LTE), to name but a few. Numerous technologies and standards have been developed during the last few decades, and it can be expected that similar developments will continue into the future. Specifications are developed in a variety of organizations such as the 3$^{rd}$ Generation Partnership Project (3GPP), 3GPP2 and IEEE.

Communication between network nodes such as base stations and user equipment may be based on standardization, standard protocols and standard specifications, allowing the parties to the communication to interact appropriately. There are some scenarios, however, where a UE or network node operates in ways that are not defined by standard. Some UEs, for example, have performance limitations that prevent them from implementing all of the features required by a standard. As an example, Category 0 devices may have certain performance limitations because they are equipped with only one receive antenna.

In some circumstances, it may be beneficial for a network node to enhance the coverage of essential downlink (DL) transmission messages if a UE is known to have such limitations. Accordingly, information regarding the coverage limitations should be known to the network node at an early stage of the UE entering the network. The UE should also be able to receive SIBs transmitted by the network reliably. Without reading system information, a UE cannot attempt to establish a radio resource control (RRC) connection with the network.

In LTE networks, system information blocks, such as SIB1, SIB2 and other System Information (SI) messages comprise network-access related information for incoming UEs. These system information blocks are scheduled in the physical downlink shared channel (PDSCH), and their location is indicated by physical downlink control channel (PDCCH). The cyclic redundancy check (CRC) of PDCCH is scrambled by the SI radio network temporary network identifier (SI-RNTI) as an indication of broadcast or multicast message.

In future releases of 3GPP LTE, UEs with special capabilities may be required to be supported by the LTE network. For example, Category 0 UEs may require special support from the network. In some circumstances, these UEs may be low power devices with no or limited user interaction, so called machine type communication (MTC) terminals. These UEs may comprise only one physical antenna and therefore have limited coverage. Further the UE capability may be limited to half-duplex to conserve the power. When such a UE enters a LTE network, the primary job for the UE is to find whether the network is capable of supporting functionality of such UEs. To support these types of UEs, a network should be able to provide good coverage, because reception capabilities of these UEs are very limited.

One way of enhancing the coverage of the SIBs is by increasing the transmit power of radio resources assigned for the PDSCH carrying the SIBs and the associate PDCCH. However, there are various disadvantages with this approach. Due to limits on the total transmit power, increasing the power of these resources may negatively impact network spectral efficiency because of transmit power limitation o on the resources used for the regular UEs (i.e. non-special UEs). Moreover, even if transmit power is increased for the PDSCH and PDCCH carrying the SIBs, there is no guarantee that the performance gain is improved. When all the surrounding cells also increase the transmit power levels on the same radio resources, the signal to interference levels are not improved.

SUMMARY

In some embodiments of the disclosed subject matter, a method at a network node comprises identifying a location to be allocated for a multicast message within a transmission subframe based on at least information identifying the transmission subframe, and transmitting the multicast message at the identified location in the transmission subframe.

In certain related embodiments, the multicast message is a system information block.

In certain related embodiments, identifying the location comprises determining time-frequency resources for transmitting the multicast message based on at least the information indicating the transmission subframe.

In certain related embodiments, identifying the location for the multicast message comprises identifying the location based on a combination of at least a physical cell identifier (PCI) and the information identifying the transmission subframe. In certain examples, the identifying of the location based on a combination of at least a PCI and the information identifying the transmission subframe comprises determining a start point s for the multicast message according to $$s = \left(pci \: \% \: LCM(3, N) + \text{floor}\left(\frac{i}{M}\right) \% \: N\right) \% \: N,$$

wherein i is a subframe number of the transmission subframe, pci is the physical cell identifier, b is a number of consecutive system blocks to be occupied by the multicast message, beginning at starting point s, N is any integer greater than $$\text{floor}\left(\frac{N_{SB}^{DL}}{b}\right),$$

$N_{SB}^{DL}$ is a number of system blocks, M is a number of radio frames, and LCM(3, M) is a Least Common Multiple of 3 and M. In certain examples, the identifying of the location based on a combination of at least a PCI and the information identifying the transmission subframe comprises determining a start point $s_l$ for the multicast message within transmission subframe l according to $s_\ell = ((pci, \bmod 3) + \ell) \bmod 4*\Delta$, wherein $$l = \mathrm{floor}\left(\frac{(SFN \bmod n_1)}{4}\right),$$

SFN is a system frame number, $$\Delta = \mathrm{floor}\left(\frac{N_{RBG}^{DL}}{4}\right),$$

$N_{RBG}^{DL}$ is a number of resource block groups (RBGs) in a system bandwidth, and $$N_{RBG}^{DL} = \mathrm{ceil}\left(\frac{N_{RB}^{DL}}{N_{RB}^{RBG}}\right),$$

wherein $N_{RB}^{DL}$ is a number of resource blocks in the system bandwidth and $N_{RB}^{RBG}$ is a number of resource blocks in a resource block group. In certain examples, the identifying of the location based on a combination of at least a PCI and the information identifying the transmission subframe comprises determining a start point sn for the multicast message within a transmission subframe k of a radio frame having a system frame number (SFN) such that SFN mod n1==n according to $s_n = (pci \bmod 3)*(n \bmod 3)*\Delta + \ell$, wherein n is an integer, $\ell$ is an initial start point, pci is the physical cell identifier, and $\Delta$ is a shift in frequency allocation.

In certain related embodiments, the multicast message is transmitted in a physical downlink shared channel (PDSCH).

In some embodiments of the disclosed subject matter, a method at a network node comprises identifying a transmission subframe in which to transmit a multicast message, allocating transmission resources in the transmission subframe for the multicast message, and transmitting information indicating a location of the allocated transmission resources in the transmission subframe in a control signal message having a transmission power adjusted based on at least one of information identifying the transmission subframe and a code redundancy version of the multicast message.

In certain related embodiments, the control signal message is transmitted in a physical downlink control channel (PDCCH) and the transmission resources are allocated in a physical downlink shared channel (PDSCH).

In certain related embodiments, adjusting the transmit power of the control message based on at least one of information identifying the transmission subframe and a code redundancy version of the multicast message comprises increasing the transmit power of each code redundancy version of the multicast message with substantially equal probability.

In certain related embodiments, adjusting the transmit power of the control message based on at least one of information identifying the transmission subframe and a code redundancy version of the multicast message comprises identifying the periodicity of each code redundancy version, and boosting the PDCCH that corresponds to every nth coded redundancy version of the PDSCH of the SIB, n is selected such that the PDCCH capacity of the system is optimized.

In certain related embodiments, n is selected based on the system load comprising the number of non-standard UEs and the standard compliant UEs.

In some embodiments of the disclosed subject matter, a method in a user equipment comprises identifying a location of a multicast message within a subframe based on at least information identifying the subframe, and receiving the multicast message according to the identified location in the subframe.

In certain related embodiments, the multicast message is a system information block.

In certain related embodiments, identifying the location comprises determining time-frequency resources used to transmit the multicast message based on at least the information indicating the subframe.

In certain related embodiments, identifying the location of the multicast message comprises identifying the location based on a combination of at least a physical cell identifier (PCI) and the information identifying the subframe. In some examples, identifying the location based on a combination of at least a PCI and the information identifying the subframe comprises determining a start point s for the multicast message according to $$s = \left(pci \% LCM(3, N) + \mathrm{floor}\left(\frac{i}{M}\right) \% N\right) \% N,$$

wherein i is a subframe number of the subframe, pci is the physical cell identifier, b is a number of consecutive system blocks to be occupied by the multicast message, beginning at starting point s, N is any integer greater than $$\mathrm{floor}\left(\frac{N_{SB}^{DL}}{b}\right),$$

$N_{SB}^{DL}$ is a number of system blocks, M is a number of radio frames, and LCM(3, M) is a Least Common Multiple of 3 and M. In some examples, identifying the location based on a combination of at least a PCI and the information identifying the subframe comprises determining a start point $s_l$ for the multicast message within subframe l according to $s_\ell = ((pci, \bmod 3) + \ell) \bmod 4*\Delta$, wherein $$l = \mathrm{floor}\left(\frac{(SFN \bmod n_1)}{4}\right),$$

SFN is a system frame number, $$\Delta = \mathrm{floor}\left(\frac{N_{RBG}^{DL}}{4}\right),$$

$N_{RBG}^{DL}$ is a number of resource block groups (RBGs) in a system bandwidth, and $$N_{RBG}^{DL} = ceil\left(\frac{N_{RB}^{DL}}{N_{RB}^{RBG}}\right),$$

wherein $N_{RB}^{DL}$ is a number of resource blocks in the system bandwidth and $N_{RB}^{RBG}$ is a number of resource blocks in a resource block group. In some examples, identifying the location based on a combination of at least a PCI and the information identifying the subframe comprises determining a start point $s_n$ for the multicast message within a transmission subframe k of a radio frame having a system frame number (SFN) such that SFN mod n1=n according to $s_n$=(pci mod 3)*(n mod 3)*Δ+$\ell$, wherein n is an integer, $\ell$ is an initial start point, pci is the physical cell identifier, and Δ is a shift in frequency allocation.

In certain related embodiments, the multicast message is received via a physical downlink shared channel (PDSCH).

In some embodiments of the disclosed subject matter, a network node or user equipment comprises at least one processor and/or related modules configured to perform one or more methods as described above.

BRIEF DESCRIPTION OF THE DRAWINGS

The drawings illustrate selected embodiments of the disclosed subject matter. In the drawings, like reference labels denote like features.

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

The described embodiments may be implemented in any appropriate type of communication system supporting any suitable communication standards and using any suitable components. As one example, certain embodiments may be implemented in an LTE network, such as that illustrated in FIG. 1.

Figure 1:
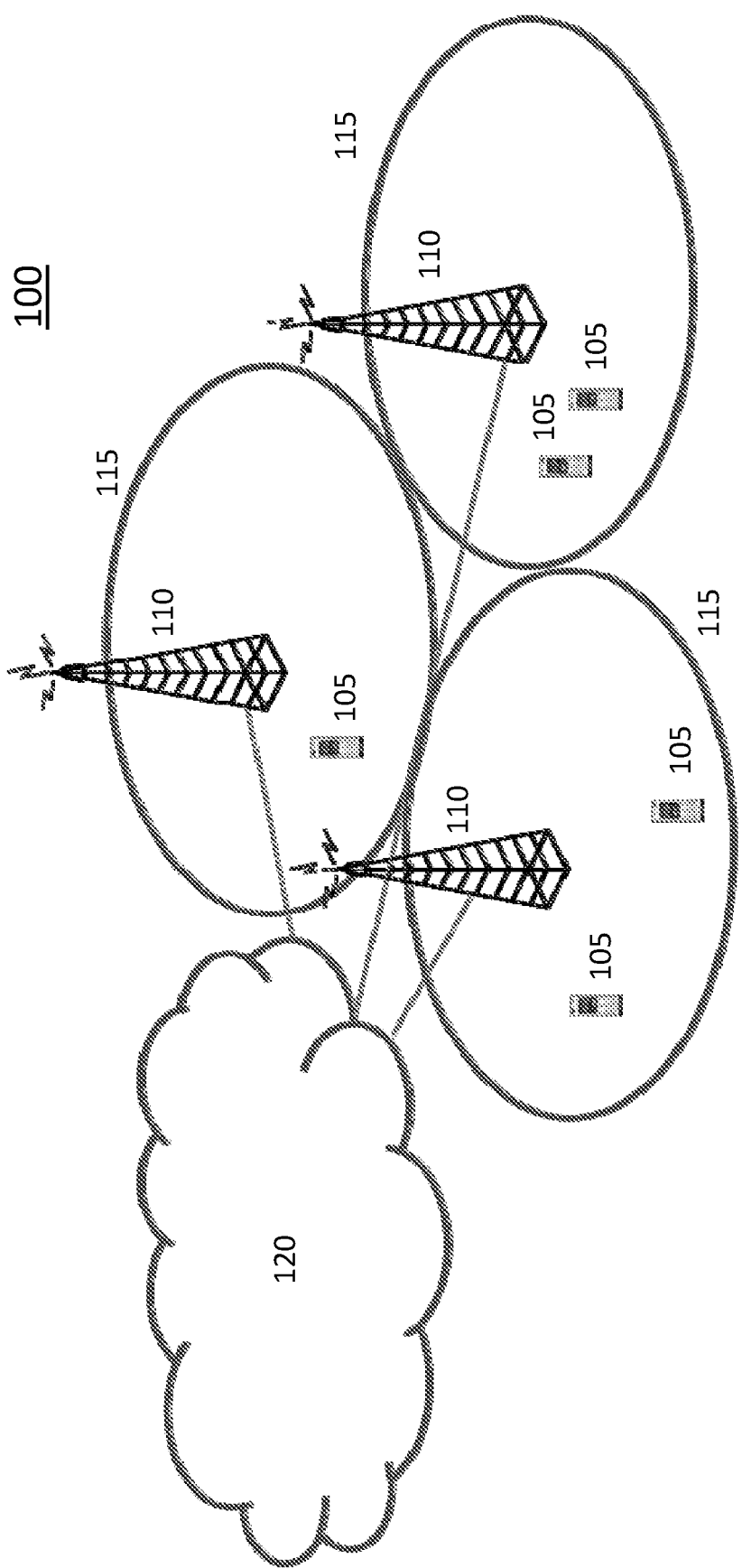
FIG. 1 is diagram illustrating a wireless communications network according to an embodiment of the disclosed subject matter.

FIG. 1 illustrates a communication network 100 according to an embodiment of the disclosed subject matter.

Referring to FIG. 1, a communication network 100 comprises a plurality of wireless communication devices 105 (e.g., UEs, machine type communication [MTC]/machine-to-machine [M2M] UEs, cellular radiotelephone—e.g., a smartphone, a feature phone; network adaptor or card, a modem or other such interface device, a tablet or laptop computer, or other device with wireless communication capabilities) and a plurality of radio access nodes 110 (e.g., eNodeBs or other base stations). Communication network 100 is organized into cells 115, which are connected to a core network 120 via corresponding radio access nodes 110. Radio access nodes 110 are capable of communicating with wireless communication devices 105 along with any additional features suitable to support communication between wireless communication devices or between a wireless communication device and another communication device (such as a landline telephone).

Figure 2A:
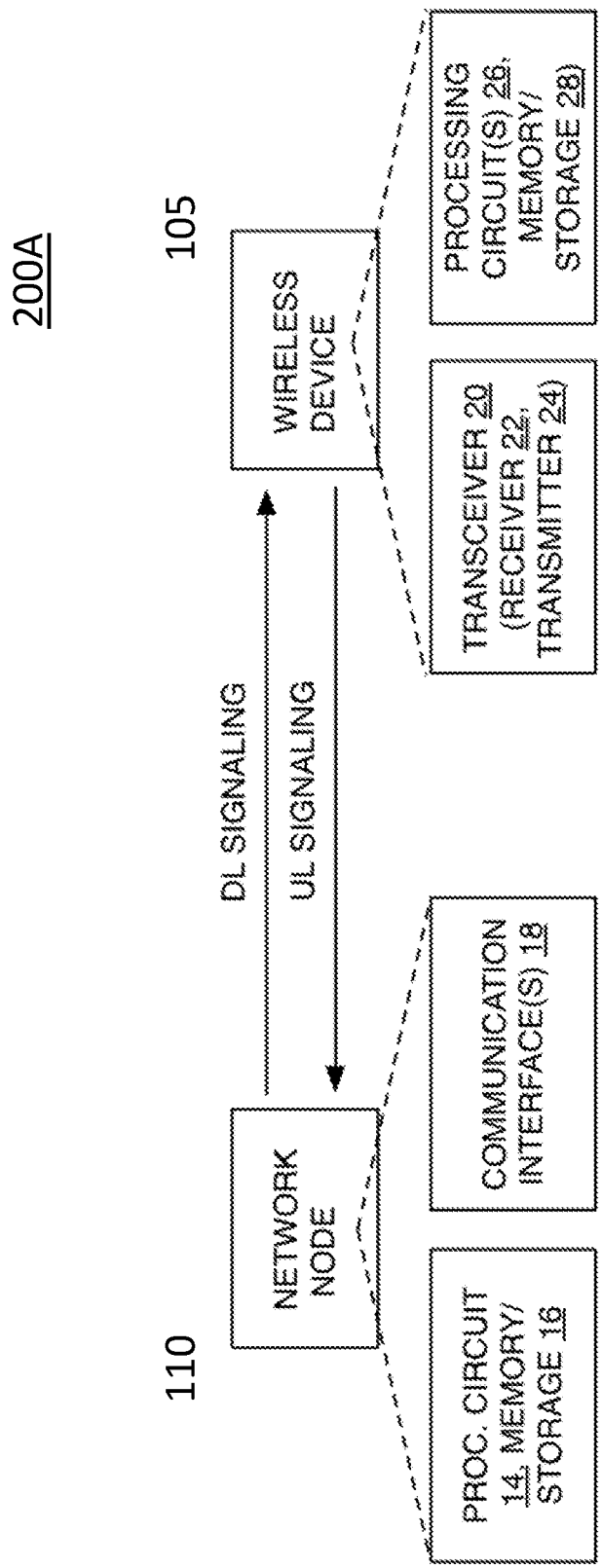
FIG. 2A is diagram illustrating a wireless communications network according to another embodiment of the disclosed subject matter.
Figure 2B:
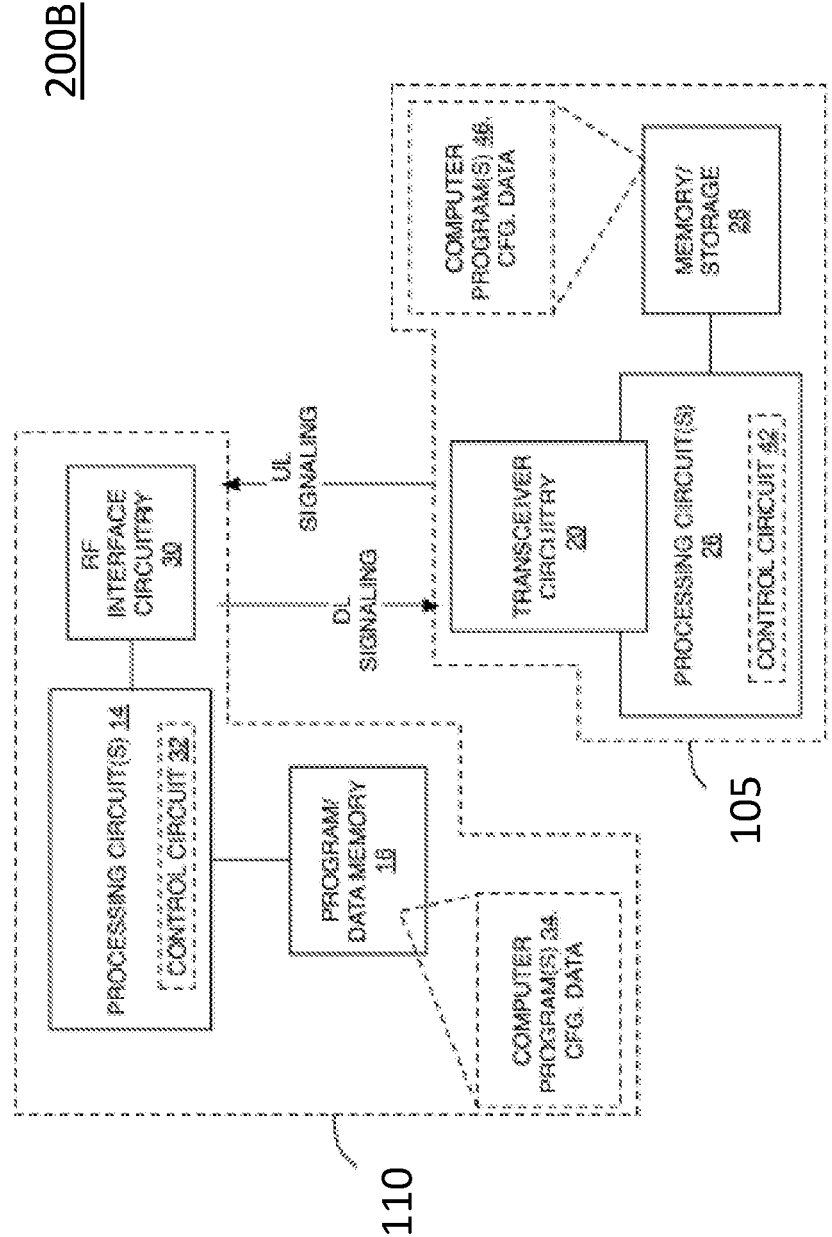
FIG. 2B is diagram illustrating a wireless communications network according to another embodiment of the disclosed subject matter.

Although wireless communication devices 105 may represent communication devices that include any suitable combination of hardware and/or software, these wireless communication devices may, in certain embodiments, represent devices such as those illustrated in greater detail by FIG. 2A or 2B. Similarly, although the illustrated radio access node may represent network nodes that include any suitable combination of hardware and/or software, these nodes may, in particular embodiments, represent devices such as the example radio access node illustrated in greater detail by FIG. 2A or 2B.

FIG. 2A illustrates a communication network 200A according to an embodiment of the disclosed subject matter. Communication network 200A represents one of many possible implementations of communication network 100.

Referring to FIG. 2A, communication network 200A comprises wireless communication device 105 and radio access node 110. In this embodiment, wireless communication device 105 comprises a transceiver 20 comprising a receiver 22 and a transmitter 24, a processing circuit 26, and memory/storage 28. Radio access node 110 comprises a processing circuit 14, memory/storage 16, and one or more communication interfaces 18. The illustrated features may represent functional and/or physical circuit arrangements, which may take the form of, e.g., digital processing circuits and associated memory or other computer-readable medium for storing configuration data, operational or working data, and for storing computer program instructions. In some embodiments, network-side and device-side functionality is realized at least in part through the programmatic configuration of digital processing circuitry, based on the execution by that circuitry of stored computer program instructions.

Memory/storage 16 and 28 may comprise, e.g., one or more types of computer-readable media, such as volatile, working memory and non-volatile configuration and program memory or storage. Communication interface 18 may be implemented according to the nature of radio access node 110. In a base station or other radio node example, communication interface 18 includes a radio transceiver, e.g., pools of radio transmission, reception, and processing circuitry, for communicating with any number of wireless communication devices 105 in any one or more cells of a wireless communication network. In such examples, communication interface 18 comprises one or more transmitters and receivers, e.g., cellular radio circuits, along with power control circuitry and associated signal-processing circuitry. Further, in the same scenario, communication interface 18 may include inter-base-station interfaces and/or backhaul or other Core Network, CN, communication interfaces.

FIG. 2B illustrates a communication network 200B according to an embodiment of the disclosed subject matter. Communication network 200B is a more detailed example of communication network 200A, in which processing circuit 14 comprises a control circuit 32, memory/storage 16 stores a computer program 34 and/or configuration data, communication interface 18 comprises RF interface circuitry 30, processing circuit 26 comprises a control circuit 42, and memory/storage 28 stores a computer program 46 and/or configuration data.

Some embodiments relate to partially standard-defined UEs and network nodes and/or to UEs and network nodes with proprietary capabilities. Partially standard-defined UEs and network nodes may refer to UEs and network nodes that do not completely follow standard specifications, e.g. 3GPP specifications. These UEs and network nodes may offer solutions and provide capabilities that are not provided in standard specifications. These capabilities may be referred to as non-standard compliant capabilities. Similarly, these UEs and network nodes may not offer all the solution or services presented in the standard specifications, and therefore only offer a limited amount of services or capabilities as compared to the standard specifications. UEs and eNB that do not fully follow standard specifications may be referred to as special UEs or special network nodes within this description.

In certain embodiments described below, the location of SIB1 or SIB2 or system information (SI) messages (in general SIs which are included as part of any of the SIBs) within a set of transmission resources is implicitly indicated to special UEs by a combination of physical cell identity (PCI), choice of scheduling block (SB) start positions and/or the radio frame number. PDCCH with normal coverage is provided for regular UEs. The dependency on PCI may indirectly provide inter-cell interference coordination gain for SIB1/SIB2 and other SIs.

In certain methods and apparatuses described below, a cell specific SB set is assigned for each SIB message. The specific SB set may change based on the system frame number (i.e. Radio frame). PDCCH pointing to radio resources of PDSCH carrying the SIB message does not need additional coverage enhancements. The special UEs which have coverage problems need not decode the PDCCH. Because the location or allocation coordinates of PDSCH carrying the SIB is a priori known, a UE can soft combine this information across the subframes and decode the SIB successfully.

A potential benefit of certain embodiments is a reduction of the risk of increased inter-cell interference by scheduling the SIBs on orthogonal resources across the network. Furthermore, since the PDCCH is not needed to indicate the radio resources of PDSCH carrying the SIBs, more PDCCH resources are available for scheduling additional UEs in the same TTI if there are PDSCH resources are available.

Figure 3:
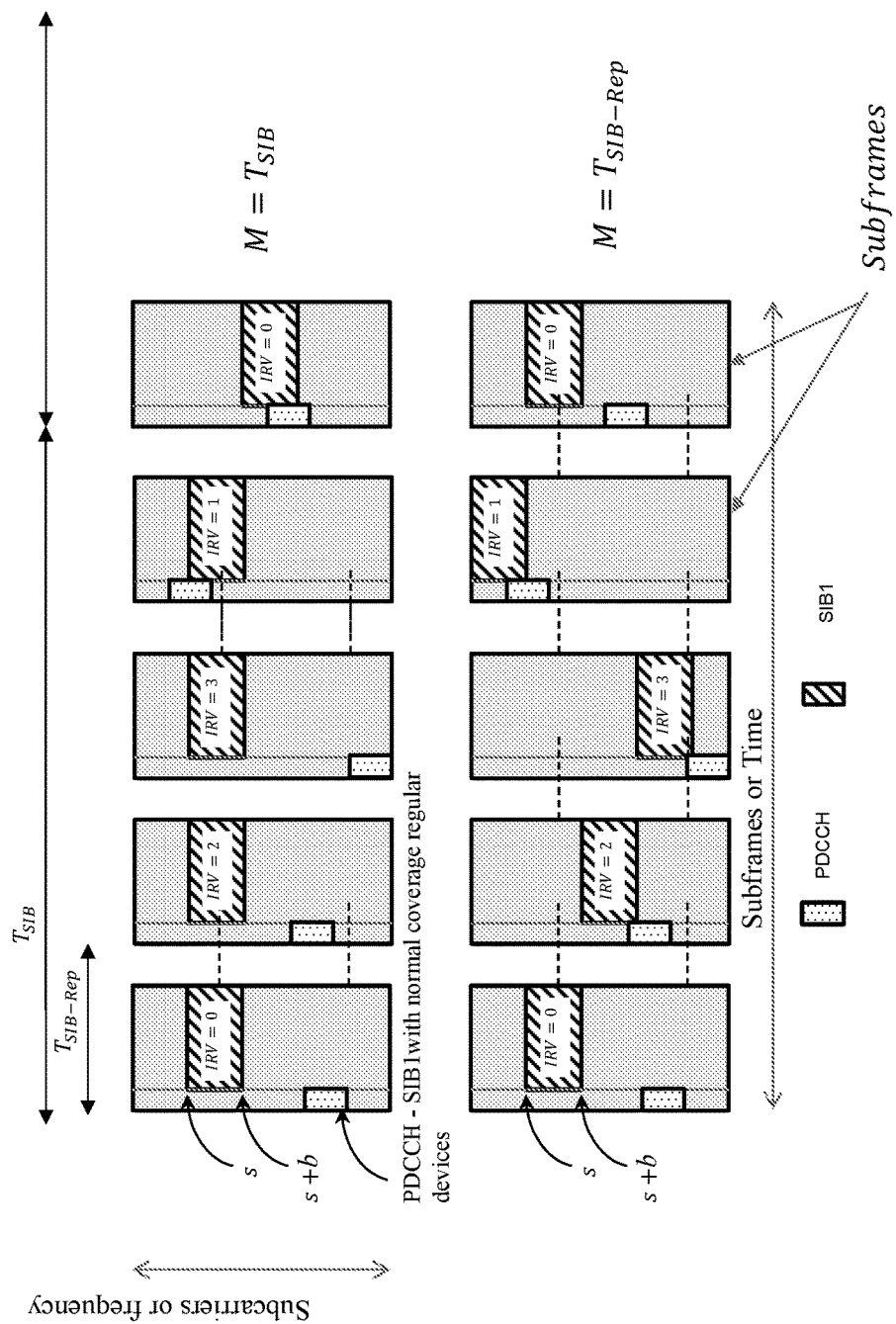
FIG. 3 is a diagram illustrating the scheduling of an SIB message based on a physical cell identifier (PCI) according to an embodiment of the disclosed subject matter.

FIG. 3 is a diagram illustrating the scheduling of an SIB message based on a PCI according to an embodiment of the disclosed subject matter.

Referring to FIG. 3, SIBs are transmitted every $T_{SIB}$ ms. Within the period of $T_{SIB}$, there will be repeated transmissions with different incremental redundancy versions (IRVs). A special UE can soft-decode these repeated transmissions to improve the decodability. Failure to decode SIB will be reduced by eliminating PDCCH for the special UEs. For example, the special UE can determine the position of the PDSCH without reading the PDCCH as follows:

Maximum Size of the SIB1 or SIB2 in SBs: b

SIB occupies in radio frame-i the b consecutive SBs starting from a start point "s" defined according to the following equation (1).

$$s = \left( pci \% LCM(3, M) + \text{floor}\left(\frac{i}{M}\right) \% N \right) \% N \quad (1)$$

In equation (1), N is any integer greater than $$\text{floor}\left(\frac{N_{SB}^{DL}}{b}\right)$$

(a typical value of N can be specified in the UE-network interface specification), pci is the physical cell ID, $N_{SB}^{DL}$ is the number of SBs in the DL, which depends on the system bandwidth, $M=T_{SIB-Rep}$ or $T_{SIB}$ in number of radio frames, and LCM(3, M) is the Least Common Multiple of 3 and M. When $M=T_{SIB}$, the location of the radio resources assigned for the PDSCH carrying the SIB changes every instant of the SIB transmissions. In this case the location of the repetitions is kept the same. When $M=T_{SIB-Rep}$, the location of the radio resources assigned for the PDSCH carrying the SIB changes every instant of the SIB repetitions.

According to one embodiment of this invention, PDCCH may still be transmitted to indicate the resources containing the PDSCH with System information or SIBs for the non-special UEs. This is the case when the same system information is required to be sent to the special UEs and other UEs attached to the network.

Figure 4:
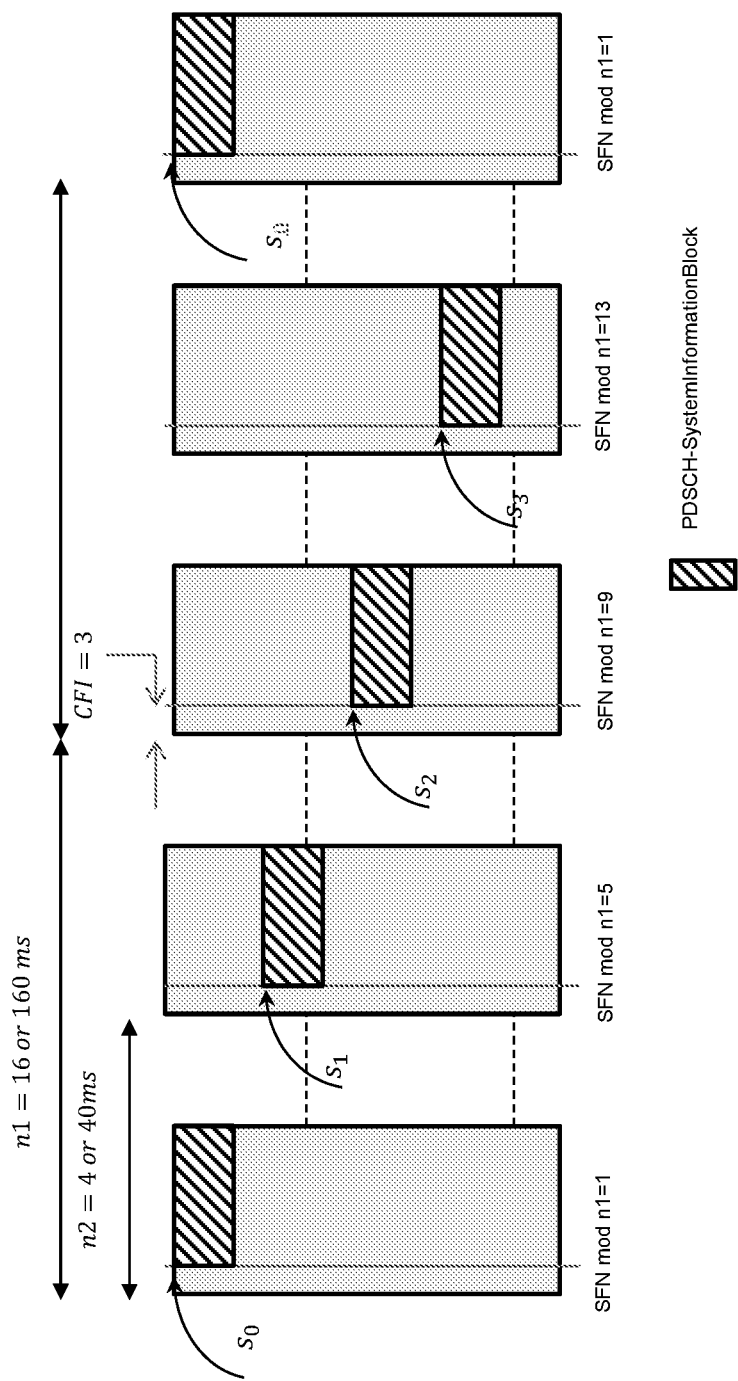
FIG. 4 is a diagram illustrating the scheduling of an SIB message based on a PCI according to an embodiment of the disclosed subject matter.

FIG. 4 is a diagram illustrating the scheduling of an SIB message based on a PCI according to an embodiment of the disclosed subject matter.

Referring to FIG. 4, the SIB can be scheduled in a selected subframe, for example in subframe #5 of radio frame having a system frame number (SFN) for which SFN mod n2=1, as follows.

The SIB is scheduled on a radio block group (RBG) indicated by $s_\ell$ as defined by equation (2) below. Further, the CFI in this subframe is fixed to CFI=3, i.e. three and four OFDM symbols are allocated for PDCCH for system bandwidths >1.4 MHz and ≤1.4 MHz respectively.

$$s_\ell = ((pci \bmod 3) + \ell) \bmod 4 * \Delta \quad (2)$$

In equation (2), $$\ell = \text{floor}\left(\frac{(SFN \bmod n_1)}{4}\right), \Delta = \text{floor}\left(\frac{N_{RBG}^{DL}}{4}\right),$$

$N_{RBG}^{DL}$ represents the number of resource block groups (RBGs) in the system bandwidth, and $$N_{RBG}^{DL} = \text{ceil}\left(\frac{N_{RB}^{DL}}{N_{RB}^{RBG}}\right),$$

whre $N_{RB}^{RBG}$ represents the number of resoure blocks per resource block group and $N_{RBG}^{DL}$ represents the number of resource block groups in the system bandwidth. For example, for 10 MHz system bandwidth, $N_{RB}^{DL}=50$, $N_{RB}^{RBG}=3$ and $N_{RBG}^{DL}=17$. FIG. 4 illustartes the scenario with n1=16 or 160 ms and n2=4 or 40 ms.

According to one of the embodiments, the allocation size for the SIB can be fixed to a predefined number of SBs.

Normally the pci is assigned such that pci % 3 is not the same for interfering cells. This is to ensure that the cell specific reference signals (CRS) are staggered across the bandwidth. To further ensure the start point of the SB does not collide across the neighbor cells, the start point of SIB scheduling is derived as pci % LCM(3, N). N is derived by the total number of available SBs and the number of SBs required to carry the SIB message.

Each SIB message can be scheduled in a different subframe to avoid collisions.

Typically, the value of b, the number of SBs that are required to carry the SIB can be included in the specification or included in another special SIB or Master information Block (MIB).

Figure 5:
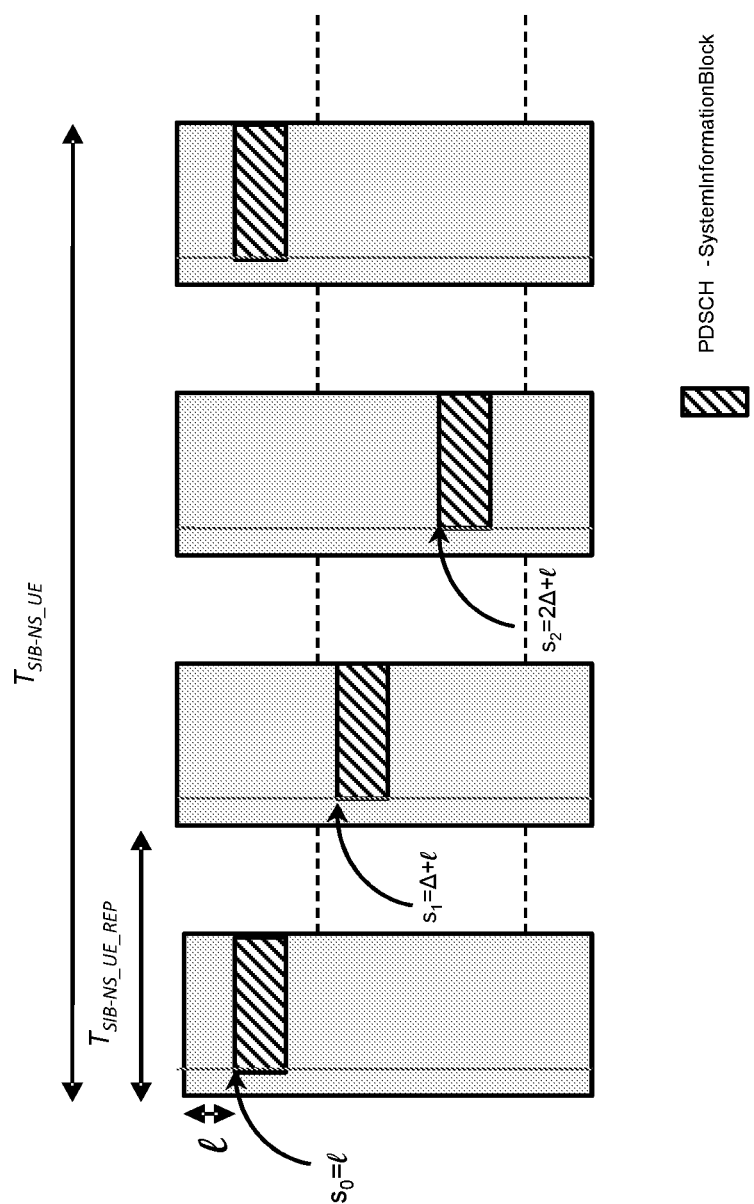
FIG. 5 is a diagram illustrating the scheduling of an SIB message based on a PCI according to an embodiment of the disclosed subject matter.

FIG. 5 is a diagram illustrating the scheduling of an SIB message based on a PCI according to an embodiment of the disclosed subject matter.

Referring to FIG. 5, the SIB allocation in the assigned subframes can be performed as follows. If the SIB is scheduled to be every n1 radio frames, i.e. SIB is transmitted in a radio frame number or system frame number, SFN when SFN mod n1 is equal to zero. Similarly, if n2 (where n2<n1) additional SIB repetitions are transmitted within the period of n1, then the (n2+1) transmissions of SIB occur in the radio frames which satisfy the following conditions: SFN mod n1==0, SFN mod n1==1, SFN mod n1==2, and SFN mod n1==n2.

A shift in frequency allocation, Δ within a subframe, (for example subframe k, where 0≤k≤9) of the assigned radio frame can be obtained according to the following equation (3).

$$\Delta = \text{floor}(\text{scheduling blocks Per Bw}/3) \quad (3)$$

For example, the available scheduling blocks in a 10 MHZ system bandwidth are 50, which results in a Δ of 16.

The SIB Allocation in subframe-k in radio frame SFN mod n1==0 is s0=pci mod 3*Δ+$\ell$, with size of L SBs, where 0≤$\ell$≤L.

In general, the SIB Allocation in subframe #k in radio frame SFN mod n1==n: $s_n$=(pci mod 3)*(n mod 3)*Δ+$\ell$ with size of L SBs.

Special UEs can soft combine the SIB allocations across the assignments to obtain diversity combining.

Figure 6:
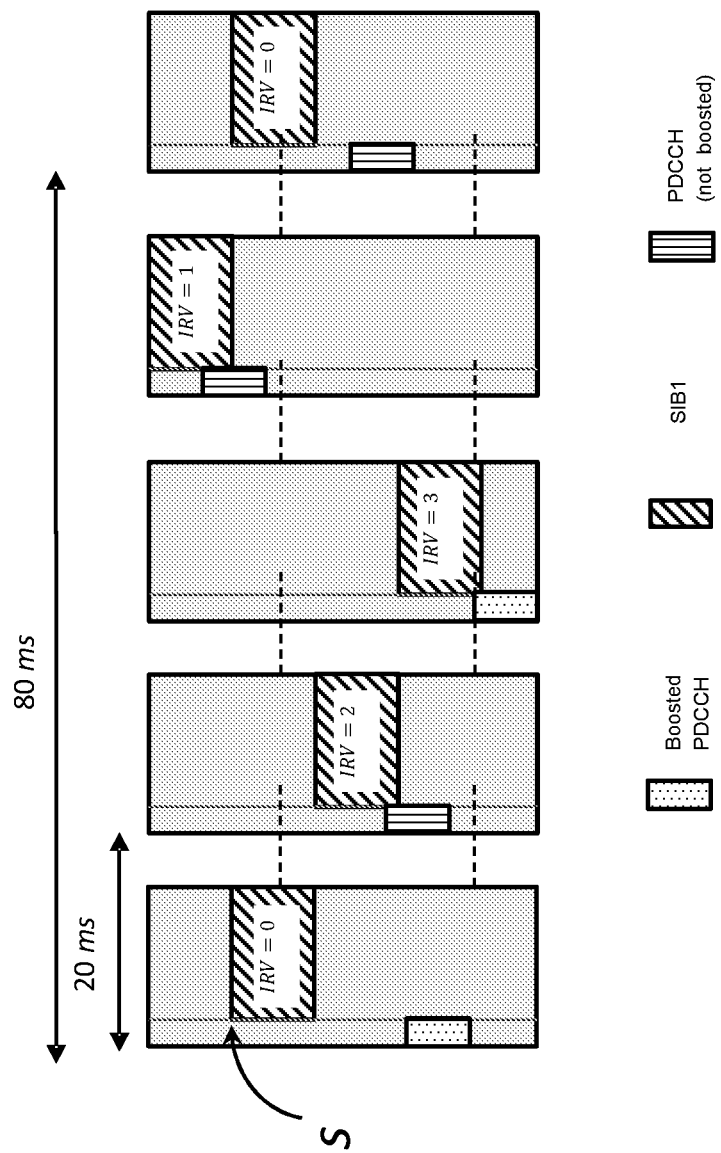
FIG. 6 is a diagram illustrating PDCCH boosting according to an embodiment of the disclosed subject matter.
Figure 7:
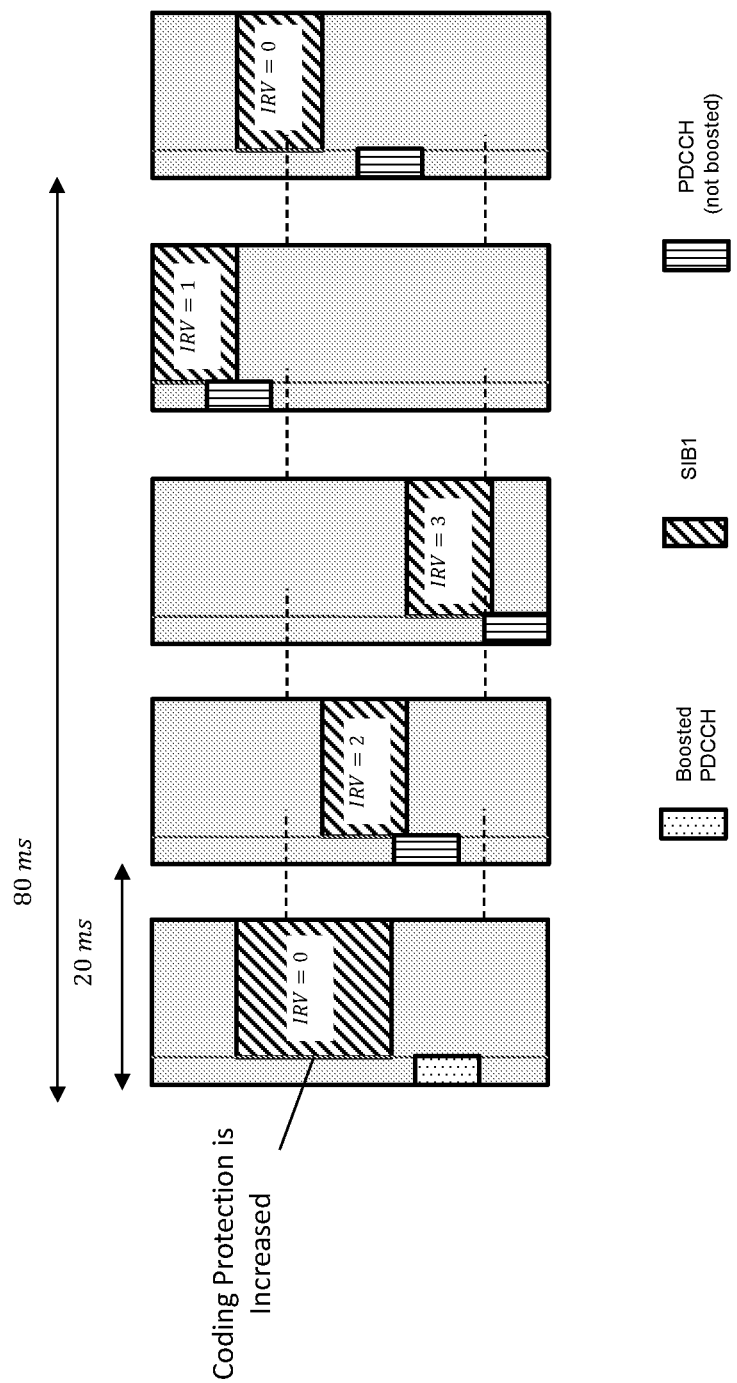
FIG. 7 is a diagram illustrating PDCCH boosting according to an embodiment of the disclosed subject matter.

FIGS. 6 and 7 illustrate PDCCH boosting according to other embodiments of the disclosed subject matter.

In general, the transmit power of a PDCCH indicating the PDSCH carrying system information can be increased to reach all UEs attached to the serving cell, including Category 0 devices, which are equipped with only one antenna for both receive and transmit functions but are not special UEs which are a priori information about the allocation coordinates of the PDSCH carrying the system information. Power boosting may ensure that UEs that are coverage limited can successfully read the system information by knowing location of PDSCH if the PDCCH is successfully decoded.

A potential drawback of boosting the transmit power of the PDCCH is that available radio resources may not be used efficiently. For example, if PDCCH is boosted by 3 dB, double the transmit power is allotted for SI broadcast. This limits the transmit power that can be used for other PDCCH allocations, to keep the peak transmit power over the bandwidth of operation within a limit. In some cases, even though there are PSDCH radio resources available for data transmission for additional UEs, there will limitation on PDCCH resources.

To reduce this capacity limitation, the PDCCH indicating the allocation of the PDSCH carrying the system information (SI) may be boosted selectively. The decision to boost the transmit power typically depends on the system load.

When the system load is high, the PDCCH can be boosted for PDSCH carrying the SI during one of the repetitions. During the PDSCH transmission associated with the boosted PDCCH transmission, the coding protection on SI can be increased such that the UEs in coverage limitation can successfully decode the PDSCH by code combining.

FIG. 6 is a diagram illustrating PDCCH boosting according to an embodiment of the disclosed subject matter.

Referring to FIG. 6, the PDCCH corresponding a subset (e.g., one or two) of PDSCH transmissions carrying SI repetitions within a SI transmission window can be boosted. In every SI transmission window, one or two randomly selected PDCCHs are boosted such that over a time, the probability of PDCCH being boosted for each repetition is substantially the same. For example, PDCCH corresponding to SI repetition transmissions 1 and 3 can be boosted in all the even SI intervals and PDCCH corresponding to SI transmissions 2 and 4 can be boosted in all the odd SI intervals.

FIG. 7 is a diagram illustrating PDCCH boosting based on system load according to an embodiment of the disclosed subject matter.

Referring to FIG. 7, the transmission power of the PDCCH corresponding to a PDSCH carrying the SI information with better coding protection (e.g., more coded bits for the same information bits) is boosted. Specifically, when the number of SBs left after the PDSCH carrying the SI is allocated and the additional PDCCHs required to use those left over resources decide the power boosting decision.

In certain variations of the embodiments in FIGS. 6 and 7, the transmit power of the PDCCH for SIB1 be selectively boosted by a maximum of, for example, 3 dB. PDCCH for one or two of the four SIB1 repetitions in every 80 ms period may be boosted. Choosing one or two repetitions for boosting is implementation dependent—controlled by a system parameter, and the PDCCH boosting can be limited to a maximum amount, for example 3 dB. UE soft combines the repetitions to obtain additional performance gain. The transmit power of the PDCCH for SIB1 in subframe 5 can be boosted when the following condition satisfies the following conditions.

Pattern 1: SFN % 32=2, 6, 8, 12, 18, 22, 24 & 28

According to another embodiment, the transmit power of the PDCCH for SIB1 in subframe 5 can be boosted when the following condition satisfies Pattern 2 (default): SFN % 64=0, 10, 20 & 30, where % represents the modulo operation.

According to one of the embodiments, the PDCCHs corresponding to all the coded redundancy versions of SIBs are boosted with substantially equal probability. One way to ensure the substantially equal probability of all the coded versions is to identify the periodicity of each coded versions of the SIBs and boosting the PDCCHs that correspond to each coded version of the SIBs periodically. For example, each SIB coded version repeats every 80 ms; code version 0 repeating every 80 ms or 8 SFNs starting from SFN number 0, code version 1 repeating every 80 ms or 8 SFNs starting from SFN number 6, code version 2 repeating every 80 ms or 8 SFNs starting from SFN number 2 and code version 3 repeating every 80 ms or 8 SFNs starting from SFN number 4.

PDCCHs that correspond to PDSCHs of SIBs transmitted in SFNs with mod(SFN, 32)=2 & 18 for code version 2, SFNs with mod(SFN, 32)=6 or 18 for code version 1, SFNs with mod(SFN, 32)=8 & 24 for code version 0 and SFNs with mod(SFN, 32)=12 & 28 for code version 3 can be picked for power boosting if every code version needs to be power boosted. Alternatively if every other occurrence each code version has to power boosted, SFNs with mod(SFN, 64)=0, 10, 20, 30 ensures the PDCCH corresponding to every alternate code redundancy version is power boosted.

Figure 8:
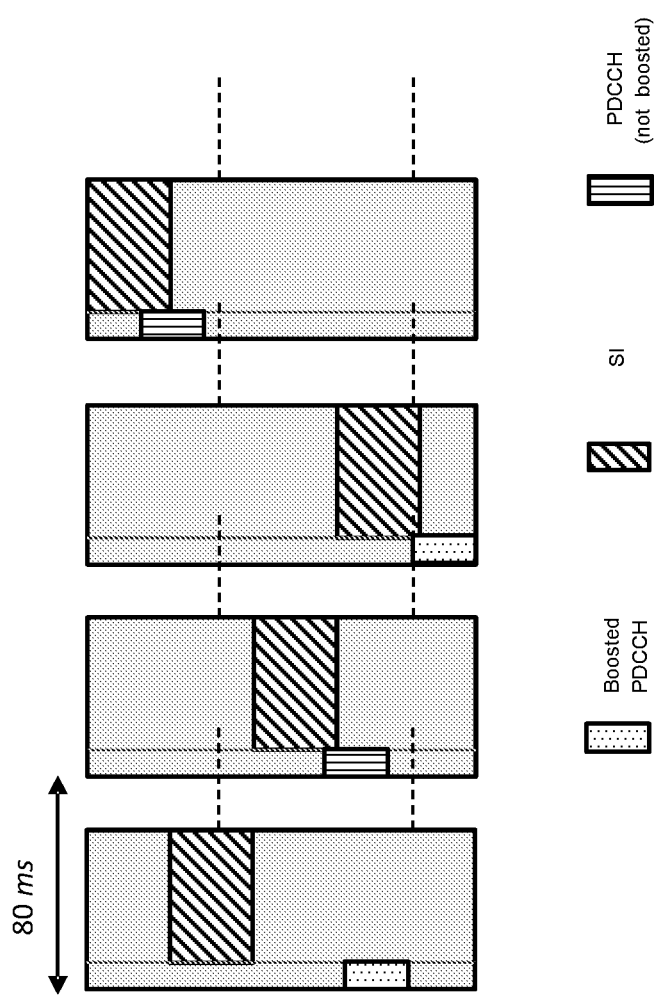
FIG. 8 is a diagram illustrating PDCCH boosting for system information (SI) broadcast messages according to an embodiment of the disclosed subject matter.

FIG. 8 is a diagram illustrating PDCCH boosting for SI broadcast messages according to an embodiment of the disclosed subject matter.

Referring to FIG. 8, the transmit power of approximately fifty percent of the PDCCHs corresponding to the SI broadcast are boosted. The selection of PDCCH for transmit power boosting is such that all the SIBs get PDCCH boosting. In the example of FIG. 8, each alternate PDCCH for an associated SI is power boosted. This procedure is applicable to all the configured SIs, $SI_i$, i=1,2, . . . ,10, according to the following equation (4).

$$SFN \bmod T_i = \text{floor}\left(\frac{x_i}{10}\right) \quad (4)$$

In equation (4), $x_i=(i-1)w$, w is the SI-WindowLength, $T_i$ is the SI-Periodicity of the SI message, and i corresponds to the order of entry in the list of SI messages configured in SIB1.

PDCCHs associated with every alternate SI transmission window, i.e. $[x_i, x_i+w]$ are power boosted.

Figure 9:
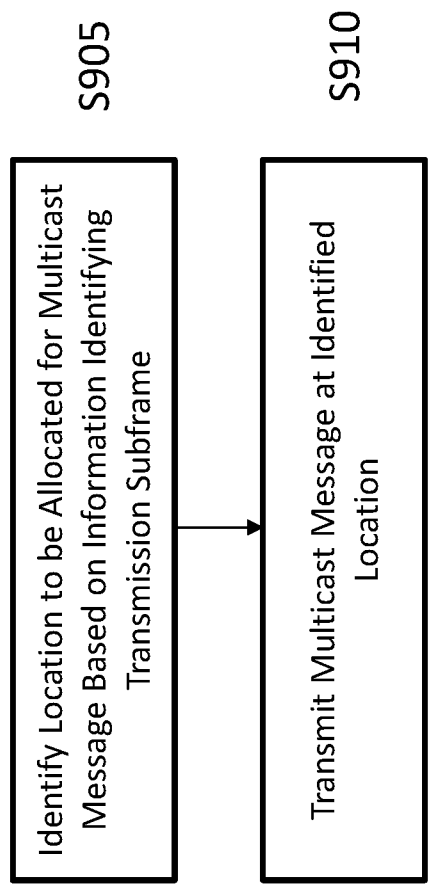
FIG. 9 is a flowchart illustrating a method at a network node according to an embodiment of the disclosed subject matter.

FIG. 9 is a flowchart illustrating a method at a network node according to an embodiment of the disclosed subject matter. The method of FIG. 9 could be performed at a network node such as any of those illustrated in FIG. 1 or 2, for instnace.

Referring to FIG. 9, the method comprises identifying a location to be allocated for a multicast message within a transmission subframe based on at least information identifying the transmission subframe (S905), and transmitting the multicast message at the identified location in the transmission subframe (S910).

In certain embodiments, the multicast message is a system information block.

In certain embodiments, identifying the location comprises determining time-frequency resources for transmitting the multicast message based on at least the information indicating the transmission subframe.

In certain embodiments, identifying the location for the multicast message comprises identifying the location based on a combination of at least a physical cell identifier (PCI) and the information identifying the transmission subframe. In some examples, identifying the location based on a combination of at least a PCI and the information identifying the transmission subframe comprises determining a start point s for the multicast message according to $$s = \left(pci \% LCM(3, N) + \text{floor}\left(\frac{i}{M}\right) \% N\right) \% N,$$

wherein i is a subframe number of the transmission subframe, pci is the physical cell identifier, b is a number of consecutive system blocks to be occupied by the multicast message, beginning at starting point s, N is any integer greater than $$\text{floor}\left(\frac{N_{SB}^{DL}}{b}\right),$$

$N_{SB}^{DL}$ is a number of system blocks, M is a number of radio frames, and LCM(3, M) is a Least Common Multiple of 3 and M. In some examples, identifying the location based on a combination of at least a PCI and the information identifying the transmission subframe comprises determining a start point $s_l$ for the multicast message within transmission subframe 1 according to $s_l = ((pci \bmod 3) + \ell) \bmod 4^*\Delta$, wherein $$\ell = \text{floor}\left(\frac{(SFN \bmod n_1)}{4}\right),$$

SFN is a system frame number, $$\Delta = \text{floor}\left(\frac{N_{RBG}^{DL}}{4}\right),$$

$N_{RBG}^{DL}$ is a number of resource block groups (RBGs) in a system bandwidth, and $$N_{RBG}^{DL} = \text{ceil}\left(\frac{N_{RB}^{DL}}{N_{RB}^{RBG}}\right),$$

wherein $N_{RB}^{DL}$ is a number of resource blocks in the system bandwidth and $N_{RB}^{RBG}$ is a number of resource blocks in a resource block group. In some examples, identifying the location based on a combination of at least a PCI and the information identifying the transmission subframe comprises determining a start point sn for the multicast message within a transmission subframe k of a radio frame having a system frame number (SFN) such that SFN mod n1==n according to $s_n=(pci \bmod 3)^*(n \bmod 3)^*\Delta + \ell$, wherein n is an integer, $\ell$ is an initial start point, pci is the physical cell identifier, and $\Delta$ is a shift in frequency allocation.

In certain embodiments, the multicast message is transmitted in a physical downlink shared channel (PDSCH).

Figure 10:
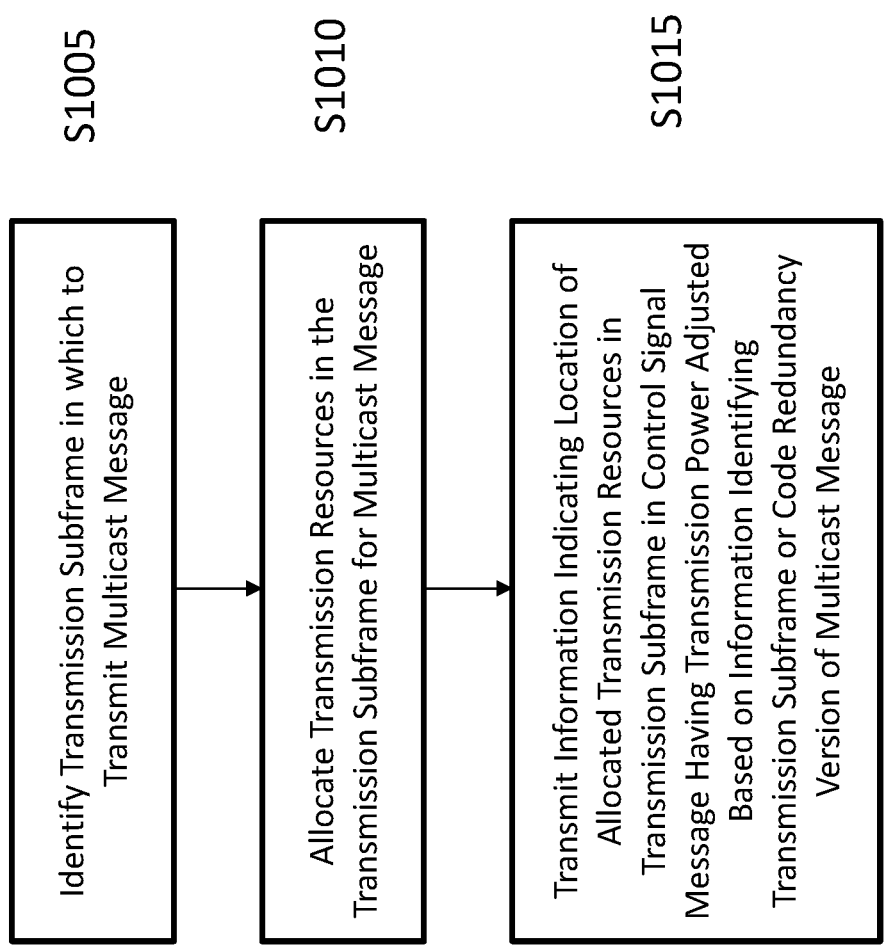
FIG. 10 is a flowchart illustrating a method at a network node according to an embodiment of the disclosed subject matter.

FIG. 10 is a flowchart illustrating a method at a network node according to an embodiment of the disclosed subject matter. The method of FIG. 10 could be performed at a network node such as any of those illustrated in FIG. 1 or 2, for instnace.

Referring to FIG. 10, the method comprises identifying a transmission subframe in which to transmit a multicast message (S1005), allocating transmission resources in the transmission subframe for the multicast message (S1010), and transmitting information indicating a location of the allocated transmission resources in the transmission subframe in a control signal message having a transmission power adjusted based on at least one of information identifying the transmission subframe and a code redundancy version of the multicast message (S1015).

In certain embodiments, the control signal message is transmitted in a physical downlink control channel (PDCCH) and the transmission resources are allocated in a physical downlink shared channel (PDSCH).

In certain embodiments, adjusting the transmit power of the control message based on at least one of information identifying the transmission subframe and a code redundancy version of the multicast message comprises increasing the transmit power of each code redundancy version of the multicast message with substantially equal probability.

In certain embodiments, adjusting the transmit power of the control message based on at least one of information identifying the transmission subframe and a code redundancy version of the multicast message comprises identifying the periodicity of each code redundancy version, and boosting the PDCCH that corresponds to every nth coded redundancy version of the PDSCH of the SIB, n is selected such that the PDCCH capacity of the system is optimized. In some examples, n is selected based on the system load comprising the number of non-standard UEs and the standard compliant UEs.

Figure 11:
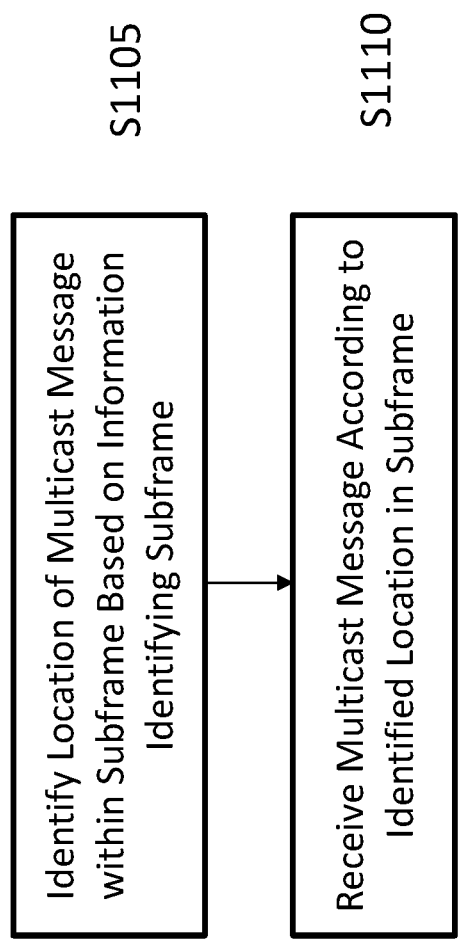
FIG. 11 is a flowchart illustrating a method at a user equipment according to an embodiment of the disclosed subject matter.

FIG. 11 is a flowchart illustrating a method at a user equipment according to an embodiment of the disclosed subject matter. The method of FIG. 11 could be performed at a network node such as any of those illustrated in FIG. 1 or 2, for instnace.

Referring to FIG. 11, a method in a user equipment comprises identifying a location of a multicast message within a subframe based on at least information identifying the subframe (S1105), and receiving the multicast message according to the identified location in the subframe (S1110).

In certain embodiments, the multicast message is a system information block.

In certain embodiments, identifying the location comprises determining time-frequency resources used to transmit the multicast message based on at least the information indicating the subframe.

In certain embodiments, identifying the location of the multicast message comprises identifying the location based on a combination of at least a physical cell identifier (PCI) and the information identifying the subframe. In some examples, identifying the location based on a combination of at least a PCI and the information identifying the subframe comprises determining a start point s for the multicast message according to $$s = \left(pci \% LCM(3, N) + \text{floor}\left(\frac{i}{M}\right) \% N\right) \% N,$$

wherein i is a subframe number of the subframe, pci is the physical cell identifier, b is a number of consecutive system blocks to be occupied by the multicast message, beginning at starting point s, N is any integer greater than $$\text{floor}\left(\frac{N_{SB}^{DL}}{b}\right),$$

$N_{SB}^{DL}$ is a number of system blocks, M is a number of radio frames, and LCM(3, M) is a Least Common Multiple of 3 and M. In some examples, identifying the location based on a combination of at least a PCI and the information identifying the subframe comprises determining a start point $s_l$ for the multicast message within subframe 1 according to $s_\ell = ((pci \bmod 3) + \ell) \bmod 4*\Delta$, wherein $$\ell = \text{floor}\left(\frac{(SFN \bmod n_1)}{4}\right),$$

SFN is a system frame number, $$\Delta = \text{floor}\left(\frac{N_{RBG}^{DL}}{4}\right),$$

$N_{RBG}^{DL}$ is a number of resource block groups (RBGs) in a system bandwidth, and $$N_{RBG}^{DL} = \text{ceil}\left(\frac{N_{RB}^{DL}}{N_{RB}^{RBG}}\right),$$

wherein $N_{RB}^{DL}$ is a number of resource blocks in the system bandwidth and $N_{RB}^{RBG}$ is a number of resource blocks in a resource block group. In some examples, identifying the location based on a combination of at least a PCI and the information identifying the subframe comprises determining a start point $s_n$ for the multicast message within a transmission subframe k of a radio frame having a system frame number (SFN) such that SFN mod n1==n according to $s_n = (pci \bmod 3)*(n \bmod 3)*\Delta + \ell$, wherein n is an integer, $\ell$ is an initial start point, pci is the physical cell identifier, and $\Delta$ is a shift in frequency allocation.

In certain embodiments, the multicast message is received via a physical downlink shared channel (PDSCH).

The terminology used herein is for the purpose of describing certain embodiments and is not intended to limit the disclosed subject matter. Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of this specification and the relevant art and will not be interpreted in an idealized or overly formal sense expressly so defined.

Where an element is referred to as being "connected", "coupled", "responsive", etc., to another feature, it can be directly connected, coupled, or responsive to the other feature, or intervening features may be present. In contrast, where a feature is referred to as being "directly connected", "directly coupled", "directly responsive", etc., to another feature, there are no intervening features present. Like numbers refer to like features throughout. Furthermore, "coupled", "connected", "responsive", etc., may include e.g. wirelessly coupled, connected, or responsive. As used herein, the singular forms "a", "an" and "the" are intended to include the plural forms as well, unless the context clearly indicates otherwise. Descriptions of known functions or constructions may be omitted for the sake of brevity and/or clarity. The term "and/or" includes any and all combinations of one or more of the associated listed items.

The terms first, second, third, etc. may be used herein to describe various features, but the described features should not be limited by these terms. Rather, these terms are used merely to distinguish one feature from another. Thus a first feature could be termed a second feature in alternative embodiments (or vice versa) without changing the meaning of the description.

As used herein, the terms "comprise", "comprising", "comprises", "include", "including", "includes", "have", "has", "having", or variants thereof are open-ended, and include one or more stated features but does not preclude the presence or addition of one or more other features. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Certain embodiments are described with reference to block diagrams and/or flowchart illustrations of computer-implemented methods, apparatus (systems and/or devices) and/or computer program products. A block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

In some alternate implementations, functions/acts noted in blocks may occur in an order different from that illustrated in the flowcharts. For example, two blocks shown in succession may be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of disclosed subject matter. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of disclosed subject matter.

While the disclosed subject matter has been presented above with reference to various embodiments, it will be understood that various changes in form and details may be made to the described embodiments without departing from the overall scope of the disclosed subject matter.

What is claimed:

1. A method at a network node, comprising:
   identifying a location to be allocated for a multicast message within a transmission subframe based on at least information identifying the transmission subframe; and
   transmitting the multicast message at the identified location in the transmission subframe,
   wherein identifying the location for the multicast message comprises identifying the location based on a combination of at least a physical cell identifier (PCI) and the information identifying the transmission subframe, by one of:
   determining a start point s for the multicast message according to $$s = \left(pci \% LCM(3, N) + \text{floor}\left(\frac{i}{M}\right) \% N\right) \% N,$$

wherein i is a subframe number of the transmission subframe, pci is the physical cell identifier, b is a number of consecutive system blocks to be occupied by the multicast message, beginning at starting point s, N is any integer greater than $$\text{floor}\left(\frac{N_{SB}^{DL}}{b}\right),$$

$N_{SB}^{DL}$ is a number of system blocks, M is a number of radio frames, and LCM(3, M) is a Least Common Multiple of 3 and M;
   determining a start point $s_l$ for the multicast message within transmission subframe l according to $s_\ell = ((pci \mod 3) + \ell) \mod 4 * \Delta$, wherein $$\ell = \text{floor}\left(\frac{(SFN \mod n_1)}{4}\right),$$

SFN is a system frame number, $$\Delta = \text{floor}\left(\frac{N_{RBG}^{DL}}{4}\right),$$

$N_{RBG}^{DL}$ is a number of resource block groups (RBGs) in a system bandwidth, and $$N_{RBG}^{DL} = \text{ceil}\left(\frac{N_{RB}^{DL}}{N_{RB}^{RBG}}\right),$$

wherein $N_{RB}^{DL}$ is a number of resource blocks in the system bandwidth and $N_{RB}^{RBG}$ is a number of resource blocks in a resource block group; and determining a start point $s_n$ for the multicast message within a transmission subframe k of a radio frame having a system frame number (SFN) such that SFN mod n1==n according to $s_n$=(pci mod 3)*(n mod 3)*Δ+ $\ell$, wherein n is an integer, $\ell$ is an initial start point, pci is the physical cell identifier, and Δ is a shift in frequency allocation.

2. The method of claim 1 wherein the multicast message is a system information block.

3. The method of claim 1, wherein identifying the location comprises determining time-frequency resources for transmitting the multicast message based on at least the information indicating the transmission subframe.

4. The method of claim 1, wherein identifying the location based on a combination of at least a PCI and the information identifying the transmission subframe comprises:

determining a start point s for the multicast message according to $$s = \left(pci \% LCM(3, N) + \text{floor}\left(\frac{i}{M}\right) \% N\right) \% N,$$

wherein i is a subframe number of the transmission subframe, pci is the physical cell identifier, b is a number of consecutive system blocks to be occupied by the multicast message, beginning at starting point s, N is any integer greater than $$\text{floor}\left(\frac{N_{SB}^{DL}}{b}\right),$$

$N_{SB}^{DL}$ is a number of system blocks, M is a number of radio frames, and LCM(3, M) is a Least Common Multiple of 3 and M.

5. The method of claim 1, wherein identifying the location based on a combination of at least a PCI and the information identifying the transmission subframe comprises:

determining a start point $s_l$ for the multicast message within transmission subframe l according to $s_\ell$=((pci mod 3)+$\ell$ )mod 4*Δ, wherein $$\ell = \text{floor}\left(\frac{(SFN \bmod n_1)}{4}\right),$$

SFN is a system frame number, $$\Delta = \text{floor}\left(\frac{N_{RBG}^{DL}}{4}\right),$$

$N_{RBG}^{DL}$ is a number of resource block groups (RBGs) in a system bandwidth, and $$N_{RBG}^{DL} = \text{ceil}\left(\frac{N_{RB}^{DL}}{N_{RB}^{RBG}}\right),$$

wherein $N_{RB}^{DL}$ is a number of resource blocks in the system bandwidth and $N_{RB}^{RBG}$ is a number of resource blocks in a resource block group.

6. The method of claim 1, wherein identifying the location based on a combination of at least a PCI and the information identifying the transmission subframe comprises:

determining a start point $s_n$ for the multicast message within a transmission subframe k of a radio frame having a system frame number (SFN) such that SFN mod n1==n according to $s_n$=(pci mod 3)*(n mod 3)*Δ+ $\ell$, wherein n is an integer, $\ell$ is an initial start point, pci is the physical cell identifier, and Δ is a shift in frequency allocation.

7. The method of claim 1, wherein the multicast message is transmitted in a physical downlink shared channel (PDSCH).

8. A method in a user equipment, comprising:

identifying a location of a multicast message within a subframe based on at least information identifying the subframe; and receiving the multicast message according to the identified location in the subframe, wherein identifying the location for the multicast message comprises identifying the location based on a combination of at least a physical cell identifier (PCI) and the information identifying the subframe, by one of:

determining a start point s for the multicast message according to $$s = \left(pci \% LCM(3, N) + \text{floor}\left(\frac{i}{M}\right) \% N\right) \% N,$$

wherein i is a subframe number of the subframe, pci is the physical cell identifier, b is a number of consecutive system blocks to be occupied by the multicast message, beginning at starting point s, N is any integer greater than $$\text{floor}\left(\frac{N_{SB}^{DL}}{b}\right),$$

$N_{SB}^{DL}$ is a number of system blocks, M is a number of radio frames, and LCM(3, M) is a Least Common Multiple of 3 and M;

determining a start point $s_l$ for the multicast message within subframe l according to $s_\ell$=((pci mod 3)+ $\ell$ )mod 4*Δ, wherein $$\ell = \text{floor}\left(\frac{(SFN \bmod n_1)}{4}\right),$$

SFN is a system frame number $$\Delta = \text{floor}\left(\frac{N_{RBG}^{DL}}{4}\right),$$

$N_{RBG}^{DL}$ is a number of resource block groups (RBGs) in a system bandwidth, and $$N_{RBG}^{DL} = \text{ceil}\left(\frac{N_{RB}^{DL}}{N_{RB}^{RBG}}\right),$$

wherein $N_{RB}^{DL}$ is a number of resource blocks in the system bandwidth and $N_{RB}^{RBG}$ is a number of resource blocks in a resource block group; and determining a start point $s_n$ for the multicast message within a transmission subframe k of a radio frame having a system frame number (SFN) such that SFN mod n1==n according to $s_n$=(pci mod 3)*(n mod 3)*Δ+ $\ell$, wherein n is an integer, $\ell$ is an initial start point, pci is the physical cell identifier, and Δ is a shift in frequency allocation.

9. The method of claim 8 wherein the multicast message is a system information block.

10. The method of claim 8, wherein identifying the location comprises determining time-frequency resources used to transmit the multicast message based on at least the information indicating the subframe.

11. The method of claim 8, wherein identifying the location based on a combination of at least a PCI and the information identifying the subframe comprises:

determining a start point s for the multicast message according to $$s = \left(pci \,\%LCM(3, N) + \text{floor}\left(\frac{i}{M}\right)\%N\right)\%N,$$

wherein i is a subframe number of the subframe, pci is the physical cell identifier, b is a number of consecutive system blocks to be occupied by the multicast message, beginning at starting point s, N is any integer greater than $$\text{floor}\left(\frac{N_{SB}^{DL}}{b}\right),$$

$N_{SB}^{DL}$ is a number of system blocks, M is a number of radio frames, and LCM(3, M) is a Least Common Multiple of 3 and M.

12. The method of claim 8, wherein identifying the location based on a combination of at least a PCI and the information identifying the subframe comprises:

determining a start point $s_l$ for the multicast message within subframe 1 according to $s_\ell$=((pci mod 3)+ $\ell$ )mod 4*Δ, wherein $$\ell = \text{floor}\left(\frac{(SFN \bmod n_1)}{4}\right),$$

SFN is a system frame number, $$\Delta = \text{floor}\left(\frac{N_{RBG}^{DL}}{4}\right),$$

$N_{RBG}^{DL}$ is a number of resource block groups (RBGs) in a system bandwidth, and $$N_{RBG}^{DL} = \text{ceil}\left(\frac{N_{RB}^{DL}}{N_{RB}^{RBG}}\right),$$

wherein $N_{RB}^{DL}$ is a number of resource blocks in the system bandwidth and $N_{RB}^{RBG}$ is a number of resource blocks in a resource block group.

13. The method of claim 8, wherein identifying the location based on a combination of at least a PCI and the information identifying the subframe comprises:

determining a start point $s_n$ for the multicast message within a transmission subframe k of a radio frame having a system frame number (SFN) such that SFN mod n1==n according to $s_n$=(pci mod 3)*(n mod 3)*Δ+ $\ell$, wherein n is an integer, $\ell$ is an initial start point, pci is the physical cell identifier, and A is a shift in frequency allocation.

14. The method of claim 8, wherein the multicast message is received via a physical downlink shared channel (PDSCH).

15. A network node, comprising:
at least one processor configured to:
identify a location to be allocated for a multicast message within a transmission subframe based on at least information identifying the transmission subframe; and
transmit the multicast message at the identified location in the transmission subframe,
wherein the at least one processor is configured to identify the location for the multicast message by identifying the location based on a combination of at least a physical cell identifier (PCI) and the information identifying the transmission subframe, by one of:
determining a start point s for the multicast message according to $$s = \left(pci \,\% \,LCM(3, N) + \text{floor}\left(\frac{i}{M}\right)\% N\right)\% N,$$

wherein i is a subframe number of the transmission subframe, pci is the physical cell identifier, b is a number of consecutive system blocks to be occupied by the multicast message, beginning at starting point s, N is any integer greater than $$\text{floor}\left(\frac{N_{SB}^{DL}}{b}\right),$$

$N_{SB}^{DL}$ is a number of system blocks, M is a number of radio frames, and LCM(3, M) is a Least Common Multiple of 3 and M;

determining a start point $s_l$ for the multicast message within transmission subframe 1 according to $s_\ell$=((pci mod 3)+ $\ell$ )mod 4*Δ, wherein $$\ell = \text{floor}\left(\frac{(SFN \bmod n_1)}{4}\right),$$

SFN is a system frame number, $$\Delta = \text{floor}\left(\frac{N_{RBG}^{DL}}{4}\right),$$

$N_{RBG}{}^{DL}$ is a number of resource block groups (RBGs) in a system bandwidth, and $$N_{RBG}^{DL} = \text{ceil}\left(\frac{N_{RB}^{DL}}{N_{RB}^{RBG}}\right),$$

wherein $N_{RB}{}^{DL}$ is a number of resource blocks in the system bandwidth and $N_{RB}{}^{RBG}$ is a number of resource blocks in a resource block group; and determining a start point $s_n$ for the multicast message within a transmission subframe k of a radio frame having a system frame number (SFN) such that SFN mod n1=n according to $s_n$=(pci mod 3)*(n mod 3)*Δ+ $\ell$, wherein n is an integer, $\ell$ is an initial start point, pci is the physical cell identifier, and A is a shift in frequency allocation.

16. The network node of claim 15, wherein identifying the location based on a combination of at least a PCI and the information identifying the transmission subframe comprises:

determining a start point s for the multicast message according to $$s = \left(pci \% LCM(3, N) + \text{floor}\left(\frac{i}{M}\right) \% N\right) \% N,$$

wherein i is a subframe number of the transmission subframe, pci is the physical cell identifier, b is a number of consecutive system blocks to be occupied by the multicast message, beginning at starting point s, N is any integer greater than $$\text{floor}\left(\frac{N_{SB}^{DL}}{b}\right),$$

$N_{SB}{}^{DL}$ is a number of system blocks, M is a number of radio frames, and LCM(3, M) is a Least Common Multiple of 3 and M.

17. The network node of claim 15, wherein identifying the location based on a combination of at least a PCI and the information identifying the transmission subframe comprises:

determining a start point $s_l$ for the multicast message within transmission subframe l according to $s_\ell$=((pci mod 3)+$\ell$ )mod 4*Δ, wherein $$\ell = \text{floor}\left(\frac{(SFN \bmod n_1)}{4}\right),$$

SFN is a system frame number, $$\Delta = \text{floor}\left(\frac{N_{RBG}^{DL}}{4}\right),$$

$N_{RBG}{}^{DL}$ is a number of resource block groups (RBGs) in a system bandwidth, and $$N_{RBG}^{DL} = \text{ceil}\left(\frac{N_{RB}^{DL}}{N_{RB}^{RBG}}\right),$$

wherein $N_{RB}{}^{DL}$ is a number of resource blocks in the system bandwidth and $N_{RB}{}^{RBG}$ is a number of resource blocks in a resource block group.

18. The network node of claim 15, wherein identifying the location based on a combination of at least a PCI and the information identifying the transmission subframe comprises:

determining a start point $s_n$ for the multicast message within a transmission subframe k of a radio frame having a system frame number (SFN) such that SFN mod n1=n according to $s_n$=(pci mod 3)*(n mod 3)*Δ+ $\ell$, wherein n is an integer, $\ell$ is an initial start point, pci is the physical cell identifier, and A is a shift in frequency allocation.

19. A user equipment, comprising:
at least one processor configured to:
identify a location of a multicast message within a subframe based on at least information identifying the subframe; and
receive the multicast message according to the identified location in the subframe,
wherein the at least one processor is configured to identify the location for the multicast message by identifying the location based on a combination of at least a physical cell identifier (PCI) and the information identifying the subframe, by one of:

determining a start point s for the multicast message according to $$s = \left(pci \% LCM(3, N) + \text{floor}\left(\frac{i}{M}\right) \% N\right) \% N,$$

wherein i is a subframe number of the subframe, pci is the physical cell identifier, b is a number of consecutive system blocks to be occupied by the multicast message, beginning at starting point s, N is any integer greater than $$\text{floor}\left(\frac{N_{SB}^{DL}}{b}\right),$$

$N_{SB}{}^{DL}$ is a number of system blocks, M is a number of radio frames, and LCM(3, M) is a Least Common Multiple of 3 and M;

determining a start point $s_l$ for the multicast message within subframe l according to $s_\ell$=((pci mod 3)+ $\ell$ )mod 4*Δ, wherein $$\ell = \text{floor}\left(\frac{(SFN \bmod n_1)}{4}\right),$$

SFN is a system frame number, $$\Delta = \text{floor}\left(\frac{N_{RBG}^{DL}}{4}\right),$$

$N_{RBG}^{DL}$ is a number of resource block groups (RBGs) in a system bandwidth, and $$N_{RBG}^{DL} = \text{ceil}\left(\frac{N_{RB}^{DL}}{N_{RB}^{RBG}}\right),$$

wherein $N_{RB}^{DL}$ is a number of resource blocks in the system bandwidth and $N_{RB}^{RBG}$ is a number of resource blocks in a resource block group; and determining a start point $s_n$ for the multicast message within a transmission subframe k of a radio frame having a system frame number (SFN) such that SFN mod n1=n according to $s_n$=(pci mod 3)*(n mod 3)*Δ+ $\ell$, wherein n is an integer, $\ell$ is an initial start point, pci is the physical cell identifier, and A is a shift in frequency allocation.

20. The user equipment of claim 19 wherein the multicast message is a system information block.

21. The user equipment of claim 19, wherein identifying the location comprises determining time-frequency resources used to transmit the multicast message based on at least the information indicating the subframe.

\* \* \* \* \*